Aug. 7, 1934.    L. G. S. BROOKER    1,969,448

PHOTOGRAPHIC EMULSION CONTAINING OXA-ψ-CYANINES

Filed March 6, 1933

Fig.1. 2'-Methyl-1'-ethyloxa-ψ-cyanine iodide.

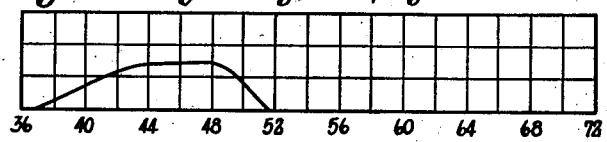

Fig.2. 2,1'-Diethyloxa-ψ-cyanine iodide.

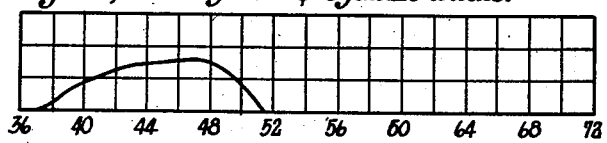

Fig.3. 2'-Methyl-1'-ethyl-3,4-benzoxa-ψ-cyanine iodide.

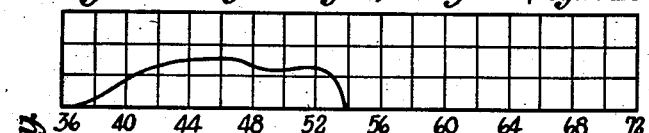

Fig.4. 2,1'-Diethyl-3,4-benzoxa-ψ-cyanine iodide.

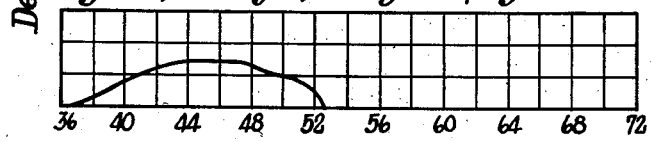

Fig.5. 2,1'-Diethyloxa-2'-pyrido cyanine iodide.

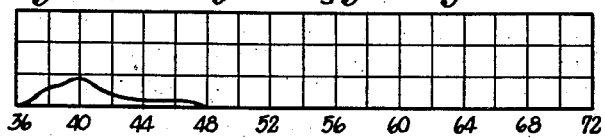

Fig.6. 2,1'-Diethylseleno-2'-pyrido cyanine iodide.

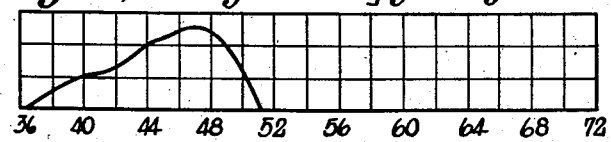

Inventor:
Leslie G. S. Brooker,
Daniel J. Mayne
Newton M. Perrins
By
Attorneys

Patented Aug. 7, 1934

1,969,448

UNITED STATES PATENT OFFICE 1,969,448

PHOTOGRAPHIC EMULSION CONTAINING OXA-ψ-CYANINES

Leslie G. S. Brooker, Rochester, N. Y., assignor to Eastman Kodak Company, Rochester, N. Y., a corporation of New York Application March 6, 1933, Serial No. 659,629

14 Claims. (Cl. 95—7)

This invention relates to new chemical compounds, and particularly to new cyanine dyes known as oxa-ψ-cyanines and methods of preparing them, as well as to photographic emulsions containing such dyes.

Various dyes have been described containing the benzoxazole nucleus, notably the dyes conveniently known as oxacarbocyanines. Dibenzoxacarbocyanine dyes derived from the μ-methylnaphthoxazoles are described in my co-pending application No. 594,380 while the oxazolo-ψ-cyanines are described in my co-pending application No. 619,960.

The dyes which would logically be termed oxa-ψ-cyanines have never been described, however, and it is one object of this invention to describe methods for the preparation of these dyes and photographic emulsions containing them. Other objects will hereinafter appear.

The 1-methylbenzoxazoles from which the oxa-ψ-cyanines may be prepared possess the structure

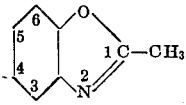

and the molecule may be numbered as shown. The system of numbering indicated here is arbitrary, but is that commonly employed, and is used, for instance, in Richter's "Lexikon der Kohlenstoff Verbindungen." Various 1-methylbenzoxazoles may be considered with substituents occupying the available positions 3, 4, 5 and 6 of the benzene nucleus fused on to the oxazole nucleus. For instance, alkyl groups may be substituted, and the μ-methylnaphthoxazoles already referred to may be regarded as substituted 1-methylbenzoxazoles.

In the preparation of the oxa-ψ-cyanines from the 1-methylbenzoxazoles, the first step is to prepare alkyl quaternary salts of these bases. This is accomplished by causing the bases to react with alkyl halides, dialkylsulfates, alkyl p-toluenesulfonates, or the like. In the case of the alkyl halides, a convenient method is to heat the base with the alkyl halide under reflux or in a sealed tube until addition occurs, and in the case of the dialkylsulfates and the alkyl p-toluenesulfonates, the base may be heated with a molecular equivalent of the sulfuric or sulfonic ester at 100° C., or perhaps higher in some cases, to bring about addition.

This reaction may be expressed as follows:

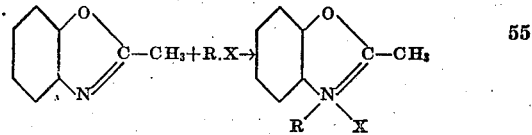

where R is an alkyl group and X is an acidic radical, such as one of those already described.

The next step is to cause the alkyl quaternary salt obtained above to react with a 2-halogenoquinoline alkyl halide, usually represented by a 2-iodoquinoline alkyliodide. This may be accomplished by using a variety of basic materials. The two salts may be suspended in one of the lower alcohols and treated, preferably in the hot, with a strong organic base such as triethylamine, diethylamine, n-methylpiperidine or triethanolamine, as described in my co-pending application Serial No. 651,870. These bases are satisfactory in use, although tertiary aliphatic bases are preferred to secondary and primary bases. It is desirable to pulverize the 2-iodoquinoline alkyl iodide thoroughly before using it for the reactions.

Using 2-iodoquinoline alkyl iodide in conjunction with triethylamine, the equation for the reaction in which the oxa-ψ-cyanines are prepared may be represented as follows:

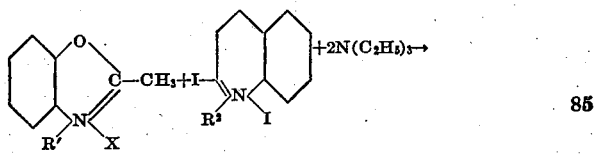

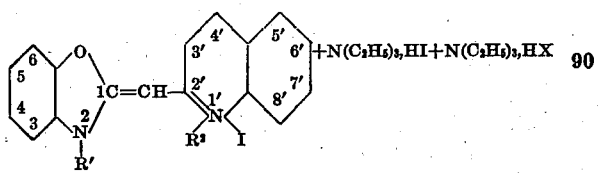

R' and R² may be similar or dissimilar alkyl groups and using the numbering shown in the structural formula, the general name for a dye of this type becomes 1'-alkyl-2-alkyloxa-ψ-cyanine salt. The dyes are usually isolated as the iodides, since these are more sparingly soluble than the alkylsulfates, p-toluenesulfonates, bromides or chlorides or the like, although these latter radicals may be employed.

From the above equation, it is seen that equivalent molecular proportions of the two different salts are required, together with two molecular equivalents of the base, in this case triethylamine. The condensation may be carried out in one of the lower alcohols, such as methyl or ethyl alcohol, and further details of the reaction are given in the examples.

The dyes may also be prepared by causing the two salts to react together in a basic solvent such as quinoline, quinaldine, dimethylaniline. In this case, some of the solvent takes part in the reaction in a chemical sense, being converted into hydroquaternary salts, the rest acts as a solvent for the reacting materials, and therefore an excess of the base is employed.

Using quinoline, the equation may be written

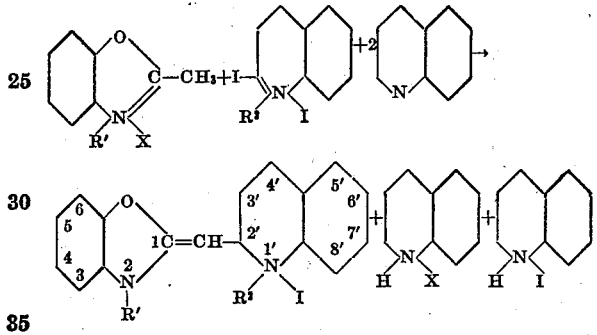

and it will be clear to those skilled in the art that very similar equations may be devised when other bases, such as quinaldine and dimethylaniline are employed. The mixture of salts may be heated with the basic solvent, a temperature of 100° C. being quite suitable. Reaction occurs and the duration of the heating is dependent upon the speed of the reaction. For instance, when quinoline is used the reaction proceeds rapidly, but when dimethylaniline is used the reaction is much slower although the yield of dye is very good. The dyes are also formed when the quinoline is used diluted with one of the lower alcohols, but it is preferred to use these bases undiluted.

The oxa-ψ-cyanine dyes may also be obtained when caustic potash or sodium ethylate is used as a condensing agent for the two salts, but the yields obtained are superior when using one of the methods described above.

It is also clear that by using various alkyl groups denoted by R' and R² in the foregoing equations and also by using quaternary salts which have substituents in one or both of the nuclei, a great many dyes, generically named oxa-ψ-cyanines, may be prepared.

By employing a 2-iodopyridine alkyl iodide in place of the 2-iodoquinoline alkyl iodide, oxa-2'-pyridocyanines of the general formula

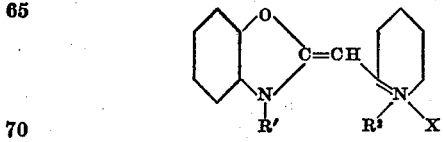

2,1'-dialkyloxa-2'-pyridocyanine salt may be prepared. In this synthesis the use of a strong organic base, especially triethylamine, is preferred, and the reaction follows very closely the scheme given above, except that the quinoline nucleus is replaced by a pyridine nucleus.

The following examples will illustrate more in detail the methods of preparing these dyes.

EXAMPLE 1

2-methyl-1'-ethyloxa-ψ-cyanine iodide 2.75 parts of 1-methylbenzoxazole methiodide and 4.1 parts of 2-iodoquinoline ethiodide are mixed together with 20 parts of quinoline and heated at 100° with constant shaking for 15 minutes. The two salts readily dissolve in the hot liquid and on cooling the dye separates out. The excess of solvent is removed by stirring the semi-solid mass with ether and decanting off the ethereal layer, and impurities are removed from the residue by stirring with acetone. The dye is filtered off, washed with water followed by acetone and recrystallized from methyl alcohol in which it gives an orange-yellow solution. The dye is obtained in interlacing yellow hairs.

EXAMPLE 2

2,1'-diethyloxa-ψ-cyanine iodide 2.9 parts (1 mol.) of 1-methylbenzoxazole ethiodide are finely pulverized in a mortar with 4.1 parts (1 mol.) of 2-iodoquinoline ethiodide and the mixture heated at 100° with 20 parts of dimethylaniline with frequent shaking for 3 hours. After allowing to cool, the dye is filtered off and the base removed by washing with acetone. The dye after washing is then purified by recrystallization from methyl alcohol, when it is obtained in orange-yellow needles which dissolve in the solvent to give an orange-yellow solution.

20 parts of quinaldine may be used in place of the 20 parts of dimethylaniline used above and 30 minutes heating at 100° then suffice. The dye separates from the reaction mixture on cooling and may be obtained in a pure state as already described.

This dye may also be obtained as follows: 2.9 parts and 4.1 parts of the two quaternary salts, taken in the order given above, are boiled with 25 parts of absolute ethyl alcohol and 2 parts (2 mols.) of triethylamine added to the hot suspension with constant shaking, and then the whole refluxed for a further ten minutes. The dye separates from the boiling liquid during the course of the reaction and is removed and purified by recrystallization from methyl alcohol as before. Molecular by equivalent amounts of the other suitable bases mentioned in the specification, such as N-methylpiperidine, triethanolamine, diethylamine, tri-n-butylamine etc. could be used in place of the triethylamine.

EXAMPLE 3

2-methyl-1'-ethyl-3,4-benzoxa-ψ-cyanine iodide 3.7 parts of 2-methyl-β-naphthoxazole are heated with 3.7 parts of methyl p-toluenesulfonate at 100° C. for 20 hours, during which time the quaternary salt formed completely solidifies. This salt is then dissolved in 35 parts of absolute ethyl alcohol by heating, and 8.2 parts of 2-iodoquinoline ethiodide added and the suspension again boiled. A solution of 4.05 parts of triethylamine in 8 parts of absolute ethyl alcohol is then gradually added to the hot suspension, with good shaking and the whole then refluxed a further 15 minutes. The dye separates out almost completely from the hot liquor and is removed, washed with water and with acetone and recrystallized from methyl alcohol. It is then obtained as minute orange-yellow crystals.

EXAMPLE 4

2,1'-Diethyl-3,4-benzoxa-ψ-cyanine iodide 5.5 parts of 2-methyl-β-naphthoxazole are heated with 6 parts of ethyl p-toluenesulfonate for two days at 145°. The crude etho-p-toluenesulfonate of the base is dissolved in 35 parts of quinoline together with 12.35 parts of 2-iodoquinoline ethiodide and the whole heated with shaking for thirty minutes at 100° C. The reaction mixture is allowed to cool and the dye precipitated with ether and purified as described for the dye in Example 1. The dye is obtained as yellow-orange needles and its solution in methyl alcohol was a yellow-orange color.

EXAMPLE 5

2,1'-Diethyloxa-2'-pyridocyanine iodide 2.9 parts (1 mol.) of 1-methylbenzoxazole ethiodide and 3.5 parts (1 mol.) of 2-iodopyridine ethiodide are heated under reflux with 12 parts of absolute ethyl alcohol and 2.1 parts (2.1 mols.) of triethylamine for 15 minutes. The reaction mixture is allowed to cool and the dye separates out. It is collected and washed and may be purified by recrystallization from ethyl alcohol, when it is obtained in the form of pale yellow compact prisms. The solution in methyl alcohol is very pale yellow.

2,1'-Diethylseleno-2'-pyridocyanine iodide is obtained in place of the above dye if an equivalent amount (1 mol.) of 1-methylbenzoselenazole ethiodide is used in place of the 1-methylbenzoxazole ethodide specified, the reaction being otherwise carried out as described. The dye separates out in the hot and after filtration and washing is purified by recrystallization from boiling methyl alcohol. It is thus obtained in deep yellow crystals and gives a pale yellow solution in the solvent. The unusual sensitizing effect of this dye upon a chloride emulsion will be noted from Fig. 6.

These dyes are useful as photographic sensitizers since they confer upon photographic emulsions, extra-sensitivity, in general, in the portions of the spectrum indicated in the attached spectrograms.

The diagrammatic spectrograms constituting the accompanying drawing illustrate the regions of the spectrum to which the various types of dyes herein disclosed will sensitize a gelatino-silver-halid emulsion and the extent of the sensitization at various wave lengths. The figures of this drawing and the dyes, the sensitizing properties of which they illustrate, are as follows—

Fig. 1, 2-methyl-1'-ethyloxa-ψ-cyanine iodide.
Fig. 2, 2,1-diethyloxa-ψ-cyanine iodide.
Fig. 3, 2-methyl-1'-ethyl-3,4-benzoxa-ψ-cyanine iodide.
Fig. 4, 2,1'-diethyl-3,4-benzoxa-ψ-cyanine iodide.
Fig. 5, 2,1-diethyloxa-2'-pyrido cyanine iodide.
Fig. 6, 2,1'-diethylseleno-2'-pyrido cyanine iodide.

The first four figures are taken using a bromide emulsion, while Figs. 5 and 6 are taken using a chloride emulsion.

The sensitization resulting from the various other dyes herein referred to and belonging to the respective classes of dyes above illustrated are all comparable to the sensitization illustrated as resulting from the specific dyes named in connection with these figures.

The preparation of gelatino-silver-halide emulsions is well known to those skilled in the photographic art. To sensitize such emulsions with the dyes herein described, I first prepare a stock solution of the dye by dissolving it in a suitable alcohol, such as methyl alcohol. Then into one liter of a flowable photographic gelatino-silver-halide emulsion I thoroughly incorporate an amount of the above stock solution (diluted somewhat with water, if desired) containing from approximately .04 to about .01 grams of the desired dye. This sensitized emulsion may then be coated upon a suitable support, such as glass, cellulose derivative, paper or the like, to a suitable thickness and allowed to dry, the details of which are well known to photographic experts. Photographic elements so sensitized have properties different from ones heretofore produced with other sensitizing dyes and hence are of special utility.

The amount of dye which is actually incorporated in a given quantity of emulsion will, of course, vary from dye to dye and emulsion to emulsion and the regulation and adoption of the most economical and useful proportions will be apparent to those skilled in the art upon observing the sensitizing power of the particular dye for the particular emulsion in question. The above proportions are, therefore, to be regarded only as illustrative and not to be understood as limiting the invention in any sense. Furthermore, it will be apparent that these dyes may be incorporated in the emulsion by other methods practiced by the art as, for instance, by bathing the plate or film upon which the emulsion has been coated, in a solution of the dye in an appropriate solvent, although this method of incorporating the dye in the emulsion is not to be preferred over that first described. Obviously, the claims are all intended to cover any combination of these dyes with a photographic emulsion whereby the dye exerts a sensitizing effect upon the emulsion.

Under the class of gelatino-silver-halide emulsions I, of course, include all of the silver halides customarily employed in the art but more particularly the silver chloride and silver bromide emulsions. Under the term photographic emulsions I include, not only the gelatino-silver-halide emulsions, but such others as are known to those skilled in the art.

What I claim as my invention, and desire to be secured by Letters Patent of the United States is:

1. A gelatino-silver-halide emulsion which contains a dye of the following structure

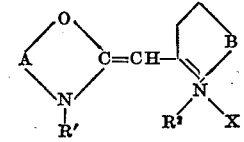

in which A is a phenylene or naphthylene group, B is a vinylene or phenylene group, R' and R³ are alkyl radicals and X is an acid radical.

2. A gelatino-silver-halide emulsion which contains a dye of the following structure

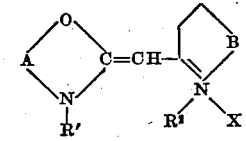

in which A is a phenylene or naphthylene group, B is a vinylene or phenylene group, R' and $R^2$ are alkyl radicals and X is an acid radical.

3. A gelatino-silver-halide emulsion which contains a dye of the following structure

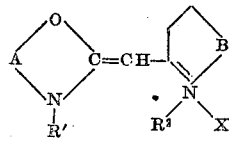

in which A is a phenylene or naphthylene group, B is a vinylene or phenylene group, R' and $R^2$ are alkyl radicals and X is a halide.

4. A gelatino-silver-halide emulsion which contains a 2,1'-dialkyloxa-pseudo-cyanine salt.

5. A gelatino-silver-halide emulsion which contains a 2,1'-dialkyloxa-pseudo-cyanine halide.

6. A gelatino-silver-halide emulsion which contains a 2-methyl-1'-ethyloxa-pseudo-cyanine halide.

7. A gelatino-silver-halide emulsion which contains a 2,1'-diethyloxa-pseudo-cyanine halide.

8. A gelatino-silver-halide emulsion which contains a 2,1'-dialkyl-3,4-benzoxa-pseudo-cyanine salt.

9. A gelatino-silver-halide emulsion which contains a 2,1'-dialkyl-3,4-benzoxa-pseudo-cyanine halide.

10. A gelatino-silver-halide emulsion which contains a 2-methyl-1'-ethyl-3,4-benzoxa-pseudo-cyanine halide.

11. A gelatino-silver-halide emulsion which contains a 2,1'-diethyl-3,4-benzoxa-pseudo-cyanine halide.

12. A gelatino-silver-halide emulsion which contains a 2,1'-diakyloxa-2'-pyridocyanine salt.

13. A gelatino-silver-halide emulsion which contains a 2,1'-diethyloxa-2'-pyridocyanine halide.

14. A photographic element comprising a supporting surface coated with a gelatino-silver-halide emulsion which contains a dye of the following structure

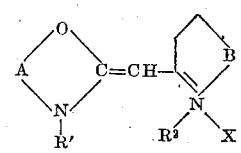

in which A is a phenylene or naphthylene group, B is a vinylene or phenylene group, R' and $R^2$ are alkyl radicals and X is an acid radical.

LESLIE G. S. BROOKER.